US008090767B2

(12) United States Patent
Adler et al.

(10) Patent No.: US 8,090,767 B2
(45) Date of Patent: Jan. 3, 2012

(54) PAIRING AND STORAGE ACCESS SCHEME BETWEEN A HANDHELD DEVICE AND A COMPUTING SYSTEM

(75) Inventors: Mitch Adler, Cupertino, CA (US); Jonathan Jay Andrews, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 209 days.

(21) Appl. No.: 12/008,068

(22) Filed: Jan. 7, 2008

(65) Prior Publication Data

US 2009/0177783 A1    Jul. 9, 2009

(51) Int. Cl.
G06F 15/16    (2006.01)
(52) U.S. Cl. ......... 709/203; 709/225; 455/418; 455/419
(58) Field of Classification Search .................. 709/203, 709/225, 228; 455/418, 419
See application file for complete search history.

(56) References Cited

U.S. PATENT DOCUMENTS

| | | |
|---|---|---|
| 5,499,378 A | 3/1996 | McNeill, Jr. et al. |
| 5,546,557 A | 8/1996 | Allen et al. |
| 5,604,906 A | 2/1997 | Murphy et al. |
| 5,649,133 A | 7/1997 | Arquie |
| 5,721,880 A | 2/1998 | McNeill, Jr. et al. |
| 5,968,170 A | 10/1999 | Gross et al. |
| 6,108,759 A | 8/2000 | Orcutt et al. |
| 6,154,810 A | 11/2000 | Derby et al. |
| 6,185,666 B1 | 2/2001 | Murray et al. |
| 6,253,300 B1 | 6/2001 | Lawrence et al. |
| 6,314,501 B1 | 11/2001 | Gulick et al. |
| 6,434,695 B1 | 8/2002 | Esfahani et al. |
| 6,453,383 B1 | 9/2002 | Stoddard et al. |
| 6,473,783 B2 | 10/2002 | Goshey et al. |
| 6,681,307 B1 | 1/2004 | Humlicek et al. |
| 6,725,328 B2 | 4/2004 | Kano et al. |
| 6,799,226 B1 | 9/2004 | Robbin et al. |
| 6,898,664 B2 | 5/2005 | Matthews et al. |
| 7,346,620 B2 | 3/2008 | Grubbs et al. |
| 7,363,398 B2 * | 4/2008 | Scott .............................. 710/52 |
| 7,395,389 B2 | 7/2008 | Kaplan et al. |
| 7,447,843 B2 | 11/2008 | Ishikawa et al. |
| 7,498,936 B2 * | 3/2009 | Maeng ....................... 340/539.1 |
| 7,664,527 B2 * | 2/2010 | Bari et al. .................. 455/553.1 |
| 7,681,007 B2 | 3/2010 | Rustagi et al. |
| 7,761,284 B2 | 7/2010 | Matze et al. |
| 2003/0079038 A1 | 4/2003 | Robbin et al. |

(Continued)

OTHER PUBLICATIONS

"Bluetooth Pairing", http://www.bluetomorrow.com/content/section/180/284, (Dec. 4, 2007), 1-3.

(Continued)

*Primary Examiner* — Khanh Dinh
(74) *Attorney, Agent, or Firm* — Blakely, Sokoloff, Taylor & Zafman LLP

(57) ABSTRACT

A method is described that involves detecting the presence of a pairing partner. Prior to establishing a paired relationship with the pairing partner, a user is prompted to verify himself/herself. In response to the user properly verifying himself/herself, the paring partner is paired with. The pairing includes invoking a remote storage protocol that contemplates a network between the partners to establish on a first of the partners access to non volatile storage resources for general use. The non volatile storage resources are located on a second of the partners. The second of the partners is a handheld device that provides wireless cell phone service, wireless Internet service and music playback service.

21 Claims, 6 Drawing Sheets

U.S. PATENT DOCUMENTS

| | | | |
|---|---|---|---|
| 2003/0167318 A1 | 9/2003 | Robbin et al. | |
| 2004/0078542 A1 | 4/2004 | Fuller et al. | |
| 2004/0117513 A1* | 6/2004 | Scott | 710/1 |
| 2004/0177180 A1 | 9/2004 | Robbin et al. | |
| 2004/0242269 A1 | 12/2004 | Fadell | |
| 2005/0015355 A1 | 1/2005 | Heller et al. | |
| 2005/0021880 A1 | 1/2005 | Robbin et al. | |
| 2005/0048961 A1* | 3/2005 | Ribaudo et al. | 455/419 |
| 2006/0093998 A1* | 5/2006 | Vertegaal | 434/236 |
| 2006/0100978 A1 | 5/2006 | Heller et al. | |
| 2006/0155914 A1 | 7/2006 | Jobs et al. | |
| 2006/0168351 A1 | 7/2006 | Ng et al. | |
| 2006/0220834 A1* | 10/2006 | Maeng | 340/539.1 |
| 2006/0294323 A1 | 12/2006 | Armstrong et al. | |
| 2007/0038743 A1* | 2/2007 | Hellhake et al. | 709/224 |
| 2007/0300033 A1 | 12/2007 | Kano | |
| 2008/0285505 A1* | 11/2008 | Carlson et al. | 370/328 |
| 2008/0287139 A1* | 11/2008 | Carlson et al. | 455/456.1 |
| 2009/0160637 A1* | 6/2009 | Maeng | 340/539.1 |
| 2011/0082704 A1* | 4/2011 | Blum | 705/2 |

OTHER PUBLICATIONS

"Server Message Block", http://en.wikipedia.org/wiki/Server_Message_Block, (Dec. 4, 2007), 1-5.

Biersdorfer, J.D. *iPod & iTunes: The Missing Manual, 4th Edition*, Mar. 2006, O'Reilly Media, Inc., p. 243.

Notice of Allowance—co-pending U.S. Appl. No. 11/586,882, filed Oct. 24, 2006, mailed Dec. 14, 2010, pp. 1-8.

* cited by examiner

PAIRING AND STORAGE ACCESS SCHEME BETWEEN A HANDHELD DEVICE AND A COMPUTING SYSTEM

FIELD OF INVENTION

The field of invention relates generally to computing systems and more specifically to a pairing and storage access scheme between a handheld device and a computing system.

BACKGROUND

The continued increase in semiconductor processing performance along with the continued decline in the cost of semiconductor devices has resulted in the emergence of "high tech" consumer products such as handheld devices capable of providing, among other things, cell phone communications, Internet communications and entertainment applications. The iPod™ and iPhone™ products offered by Apple, Inc. of Cupertino, Calif. are a good example. The iPod™ is a handheld entertainment device that couples non-volatile storage and processing resources to store and playback entertainment files (e.g., music files). The iPhone™, like the iPod™, includes the ability to store and playback entertainment files—but also—possesses additional capabilities such as cell phone and Internet communications.

FIGS. 1 and 2 depict pertinent aspects of the designs for the iPod™ and iPhone™ products as they currently exist. FIG. 1 depicts, at a high level, an iPod™ 102 being used as a local, external storage device. According to this application, the storage resource(s) 104 of the iPod™ are extended to store not only entertainment files, but also, conceivably, "anything" a user or owner of the iPod™ might wish to store on it (e.g., word processing application documents, JPEG photos, etc.). Here, the basic functionality of an iPod™ (i.e., entertainment related file storage and playback) is extended to include the basic functionality of a "memory-stick" or other portable, external non volatile storage device. According to the depiction of FIG. 1, when an iPod™ 102 is plugged into a personal computer (PC) 100, for instance through one of the PC's local I/O ports (e.g., a Universal Serial Bus (USB) port), the iPod™ 102 appears to the user as an additional storage drive (see, inset 120 of FIG. 1).

The computing systems architecture of this arrangement, shown simplistically in FIG. 1, includes a PC 100 interconnected to an iPod™ 102 through a USB 101. Here, in order for an application software program 103 executing on the PC 100 to employ the non volatile storage resources 104 of the iPod™ 102 as local, external storage (akin to a memory stick), the application software program 103 invokes the USB driver 106 (e.g., through an operating system or directly). The USB driver 107 and operating system 108 on the iPod™ cooperatively assist the PC 100 in accessing the iPod™'s non volatile storage resources 104 (which may be semiconductor based such as FLASH memory, or magnetic based such as a hard disk drive).

FIG. 2 shows the current design point of the iPhone™ product. A pertinent difference between the iPod™ and the iPhone™ is that the iPhone™, being a cell phone and Internet access device, is connected to a proprietary network 209 over which various services are provided (e.g., an iTunes™ service 210 (over which entertainment files such as music and/or video files are uploaded, downloaded, ordered, etc.); a cell phone telecommunications service; an Internet service provider service, etc.). The iPhone™ is designed primarily to use these services by wirelessly accessing 211 the network 209 and therefore includes a wireless wide area network (WWAN) I/O interface 212. The PC 200 also has a WAN interface 213 (e.g., a DSL line) through which the iTunes™ web site 210 can be reached.

In operation, iTunes™ or iPhone™ specific application software 203 running on the PC 200 is able to download/upload entertainment files, calendaring information, contact information, etc. to/from the iPhone™'s 202 non volatile storage resources. Note that, like FIG. 1, the physical connection between the PC 200 and the iPhone™ 202 flows through a local I/O port of the PC 200 (such as the PC's USB port 206).

However, architecturally speaking, note that the informational flow between the PC 200 and the iPhone™ 202 crosses the proprietary network 209. Thus, from the perspective of the PC 200, the iPhone™ is reachable only through the proprietary network 209 (even though it is actually locally connected through the USB 201). However, a drawback of this approach is that, currently, only iTunes™ or iPhone™ specific application software 203 is able to use the non volatile storage resources of the iPhone™. Said another way, unlike an iPod™, an iPhone™ cannot be used as a generic memory stick capable of storing "any" kind of information that the user might desire to store.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
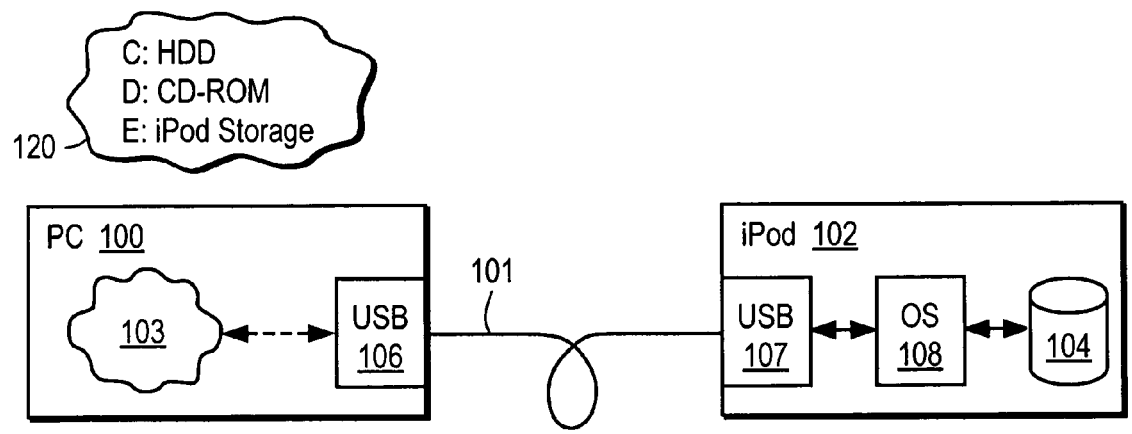
FIG. 1 shows a prior art iPod.
Figure 2:
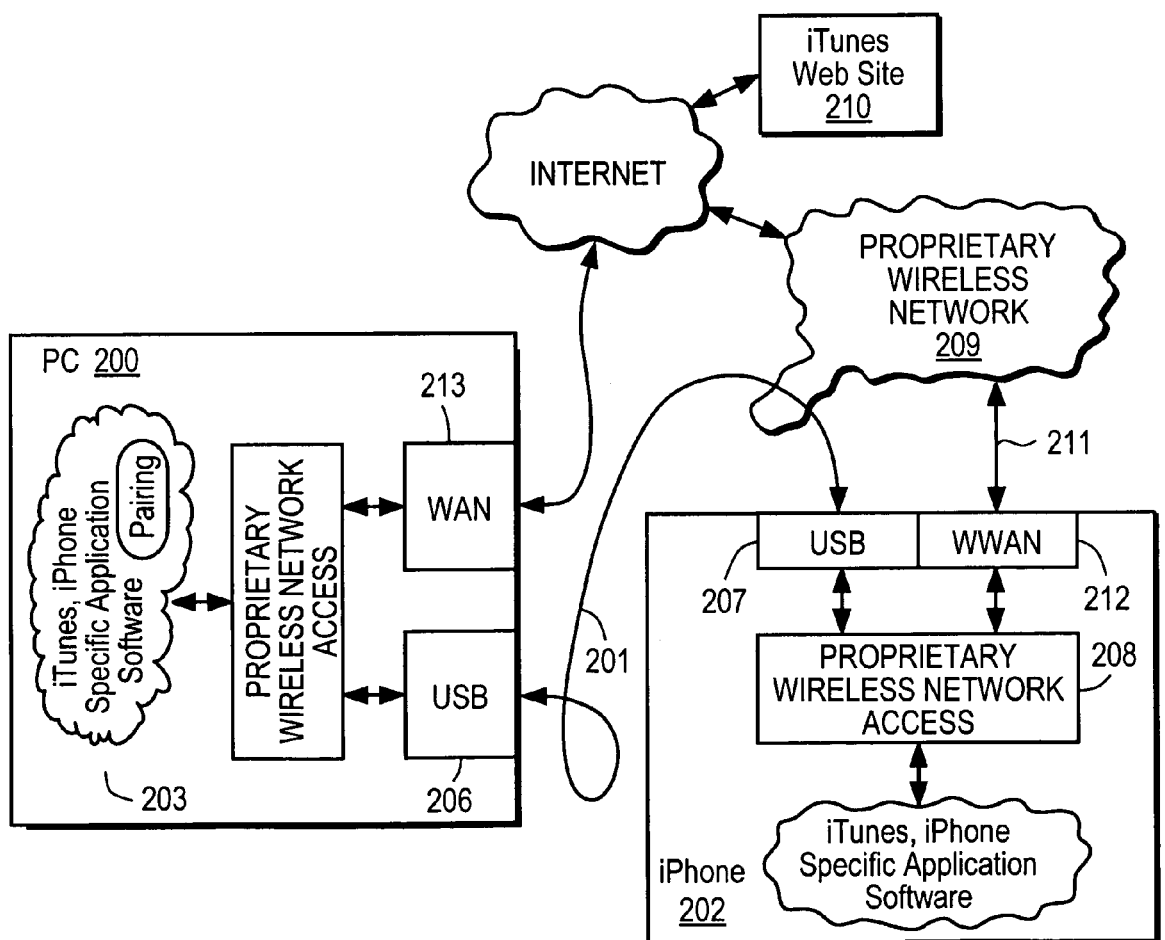
FIG. 2 shows a prior art iPhone.
Figure 3:
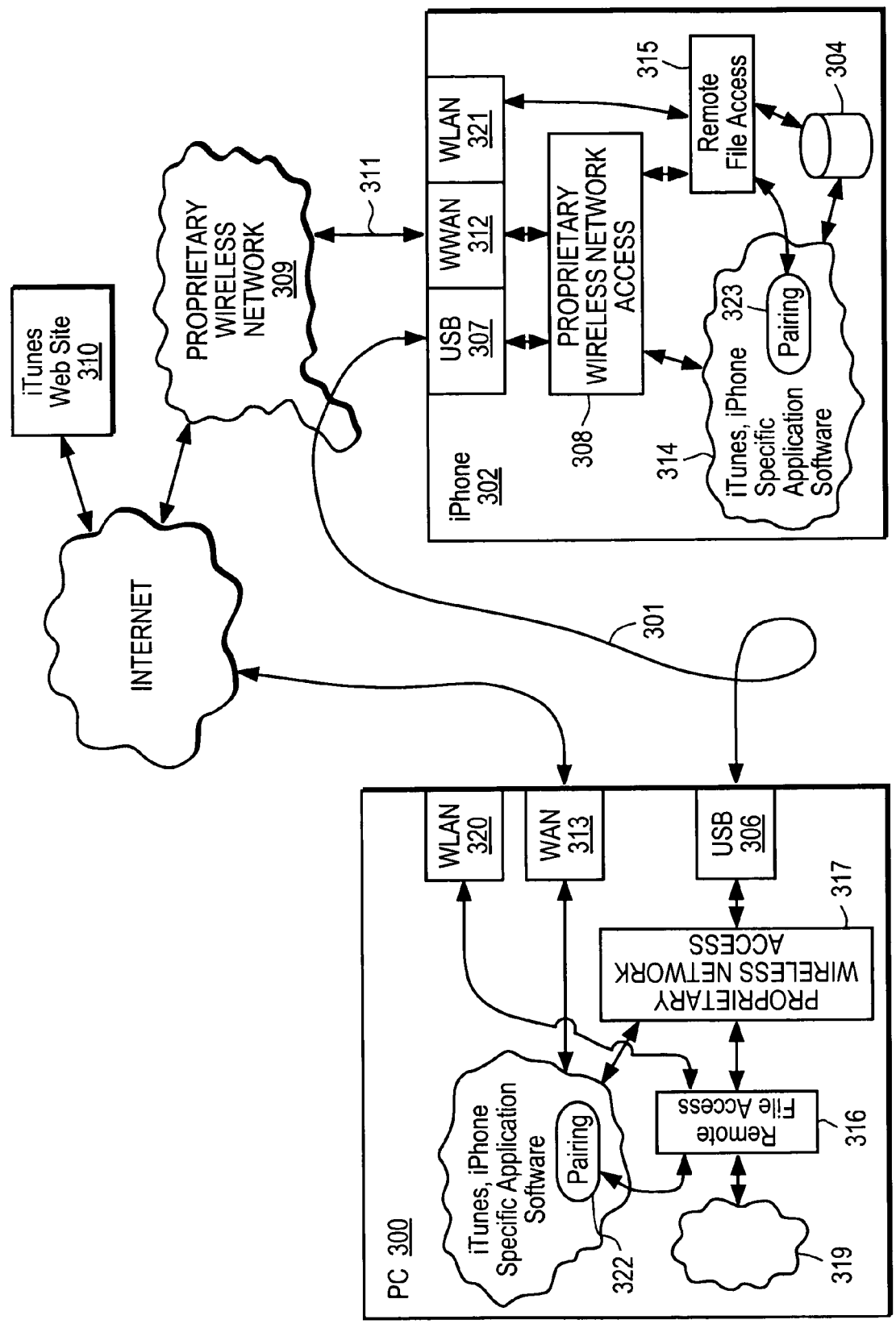
FIG. 3 shows an architecture for a handheld device that improves upon the architecture observed in FIG. 2.

FIG. 3 shows a next generation iPhone™ that has been enhanced to perform, similar to an iPod™, a "memory stick" function. Here, a remote file access layer 316 of software is coupled to the proprietary wireless network access layer 317 to, essentially, "open up" the proprietary network view of the iPhone™ 302 from the perspective of PC software 319 other than iTunes™ or iPhone™ specific software 318 for storage services on the iPhone™. That is, the remote file access interface 316 can be used by non-iTunes™/iPhone™ software to access the iPhone™'s non volatile storage resources 304. Thus, essentially, the PC continues to view the storage resources 304 of the iPhone™ as being reachable through a proprietary network 309 (as in the prior art design of FIG. 2)—however—the presence of an "open" remote file access layer 316 permits access to the storage resources 304 by software 319 other than iTunes™/iPhone™ specific software 318.

The iTunes™/iPhone™ software 318 can continue to use its legacy protocol for reaching the external storage resources 304 (i.e., operate as in the system of FIG. 2), or, may invoke the new interface 316 instead. Commands directed to the storage resources 304 through the remote file access layer 316 on the PC are formatted consistently with the protocol(s) of the network 309 by the network access layer 317. According to one implementation, the network access layer 317 is designed to manage communications by establishing "connections" between source and destination pairs. That is, for example, a first application having a need to use resources 304 would result in a first connection being established between the network access layers 317, 308 of the PC 300 and the iPhone 302, a second application having a need to use resources 304 would result in a second connection being established between the PC 300 and the iPhone 302, etc.

Figure 4:
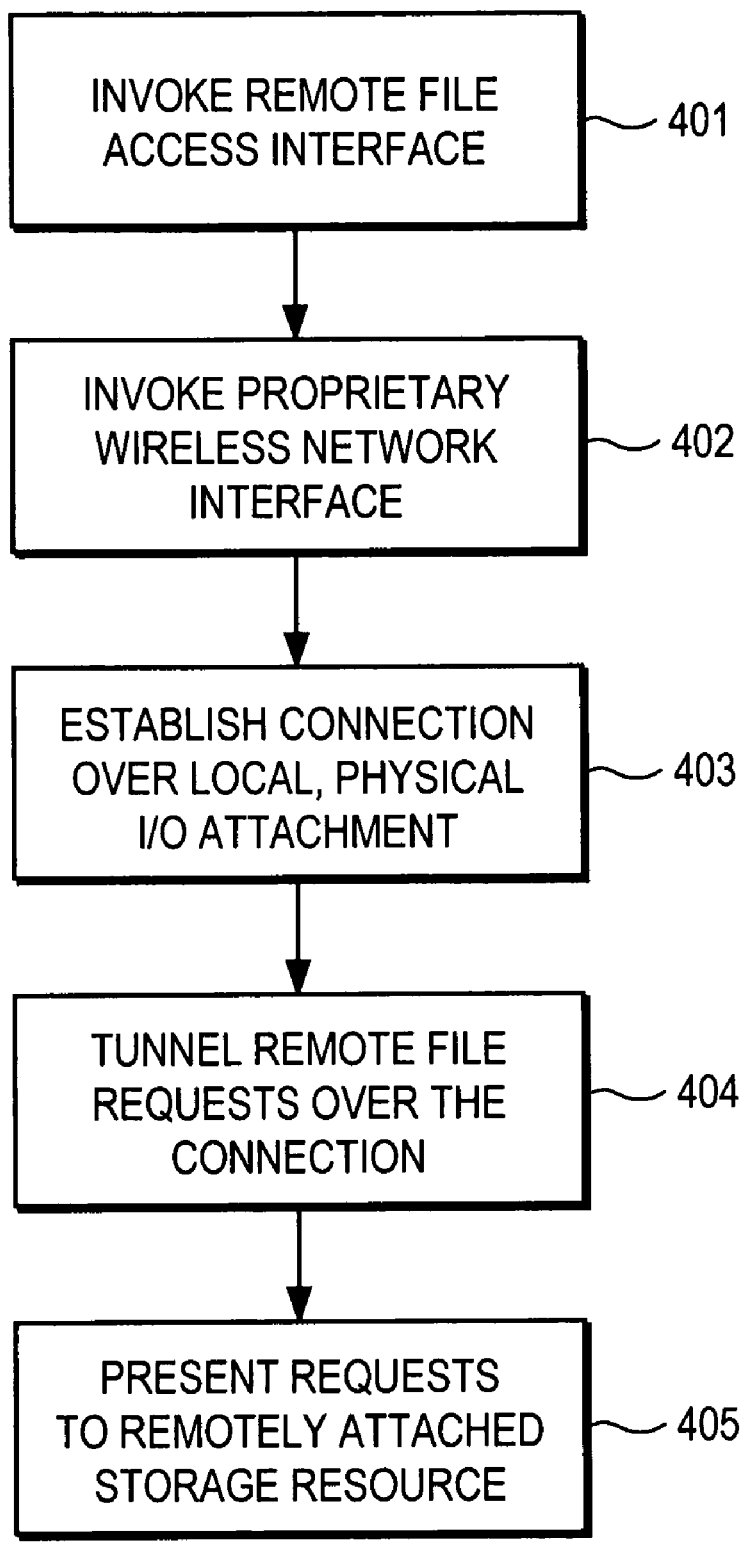
FIG. 4 shows a first process.

Thus, as shown in FIG. 4, in operation the process is as follows: 1) software (e.g., software application 319) running on the PC 300 desires access to the iPhone™'s storage resources 304 and invokes 401 the remote file access interface 316; 2) the remote file access interface 316 invokes 402 the proprietary wireless network interface 317; 3) the proprietary wireless network interface 317 establishes 403 a connection over the USB 301 with the network interface 308 on the iPhone™ 302; 4) remote access requests from the software 319 are "tunneled" 404 over the USB 301 through the artificially imposed network which are subsequently interpreted by the remote file access software 315 on the iPhone™ 302 and presented to 405 the storage resources' 304 controlling mechanism.

In an alternative approach, a quasi-permanent connection could be made to exist between the PC 300 and iPhone 302 (e.g., that is established as part of an initial pairing sequence when the iPhone is first plugged into the USB port). Once the connection is established, the network interface 317 simply forwards remote access commands issued by interface 316 over the connection (i.e., no connection establishment phase is performed between the invocation of the network interface 317 by the remote file access interface 316 and the sending of remote file access commands over the USB).

Remote file access protocols are known in the art. Examples include Common Internet File System (CIFS), Server Message Block (SMB) and Samba SMB. Typically, a remote file access protocol will effect a client-server relationship where the client issues requests to the server (typically store or read commands for specified items of data). According to one approach, when accessing the storage resources of the iPhone™, the PC 300 behaves as the client and the iPhone™ behaves as the server. Thus, for instance, the PC's remote file access protocol 316 will issue store commands with associated data and read commands identifying specific data to the network interface 317, which, subsequently, packages these commands into the appropriate format (e.g., a data packet) for transport through the artificial network on the USB 301.

Note that the diagram of FIG. 3 (and FIG. 2) indicates that the iTunes™ and iPhone™ software 318, 314 on the PC 300 and iPhone™ 302 include "pairing" routines 322, 323. Pairing is essentially a process by which computing systems automatically find one another and establish a communicative relationship with one another so that data can be exchanged between the two. According to the diagram of FIGS. 2 and 3, pairing routines 322 and 323 perform automated discovery and handshaking algorithms and invoke the network interfaces 317, 308 to support communication between the PC 300 and iPhone™ 302.

When an iPhone™ 302 is plugged into the PC's USB port 206, 306 notification of a plug-in event reaches the pairing routines 322, 323 which discover each other and execute an authentication scheme to verify that a correct or trusted iPhone™ 302 is plugged into the PC 300, and contra-wise, that the iPhone™ 302 is plugged into a correct or trusted PC 300. Here, in order for the pairing routines 322, 323 to recognize a known or trusted partner, a registration process is typically performed between the two the first time the PC 300 and iPhone™ 302 are ever connected to one another. The registration process may involve, for example, the generation of a unique passcode or key that the two partners agree will be used to verify identity during subsequent plug-in events.

According to one embodiment of the system shown in FIG. 3, as part of the pairing semantics performed by pairing routines 322, 323 when the iPhone™ 302 plugs into the USB port 306, the PC's pairing routine 322 automatically causes the remote file access layer 316 to be invoked so as to establish a "ready" client-server connection to the iPhone™'s storage resources 304 for general "memory-stick" like use upon completion of the activities initiated in response to the plug-in event. An icon that identifies the introduction of the iPhone™'s file storage resources and/or a software application or embedded function for accessing these resources (through interface 316) can pop up on the PC's display, or otherwise be made available to the user, as part of these activities.

According to another embodiment, consistent with the idea that general memory stick like usage of the iPhone™'s storage resources 304 is made available upon a plug-in event, the pairing routines 322, 323 are migrated to the remote file access layers 316, 315. As such, the authentication procedures that take place between the PC 300 and iPhone™ 302 during a plug-in event are executed from the remote file access layers 316, 315 rather than the "closed" iTune™/iPhone™ specific software 318, 314.

Another advancement observed in FIG. 3 is the presence of a wireless local area network (WLAN) interface 321 on the iPhone™. The presence of a working WLAN (e.g., WiFi, Bluetooth, etc.) between the iPhone™ 302 and the PC 300 enable an alternate communication mechanism between the two. According to the architecture of FIG. 3, the remote file access layers 316, 315 of the PC 300 and iPhone™ are respectively coupled to the WLAN interfaces 320, 321 to enable access to the iPhone™'s storage resources 304 by the PC 300 through the WLAN. Here, all the previously made comments concerning the operation of the remote file access layers 316, 315 are still applicable (except for their invocation of the proprietary network interface 317, 308), including the integration and performance of pairing routines. The coupling of pairing routines to a WWAN now permits the iPhone™ 302 to be "paired" with the trusted PC 300 simply by coming into proximity (rather than direct physical contact through the USB 301) with the PC 300.

That is, for example, if a user holding an operative iPhone™ walks into the same room as the PC, the PC 300 and iPhone™ 302 can be paired with one another through the WLAN. Here, the pairing routines detect the presence of the pairing partner through notification arising out of their respective WLAN interfaces. Integrating or otherwise coupling the pairing routines with the remote file access layers 316, 317 permits the automatic availability of remote storage services offered by the iPhone™ to the PC 300 simply by, for instance, a user holding the iPhone™ 302 and walking into the same room as the PC 300.

Here, a security issue presents itself. What happens if a third person who inappropriately is in possession of the iPhone™ walks into the same room as the PC? Here, the machines 300, 302 trust each other—but the user is not trustworthy. If the machines 300, 302 implement an automatic pairing relationship, the untrustworthy user now has access to the data stored on the iPhone™. Since the iPhone™ storage resources have been opened up to store non-iTunes™/iPhone™ specific data, potentially, highly confidential/sensitive information may now be stored on the iPhone™.

Accordingly, an embodiment includes enhancing the pairing schemes to force the user to identify himself/herself as part of the pairing process. For instance, the user may have an associated password. When the user walks into the room with the iPhone™, the pairing routines cause a window to be displayed to the user (on the PC and/or the iPhone™) that requests the user to enter his/her password. If the correct password is provided, the pairing schemes are permitted to form a communicative relationship between the two machines 300, 302. According to one embodiment, the user is given the option as to whether or not the pairing schemes are to perform user authentication/verification as part of the machine pairing process. Note that the addition of user authentication to machine pairing can also be applied to direct, physical connection over the USB 301 as well.

Figure 5:
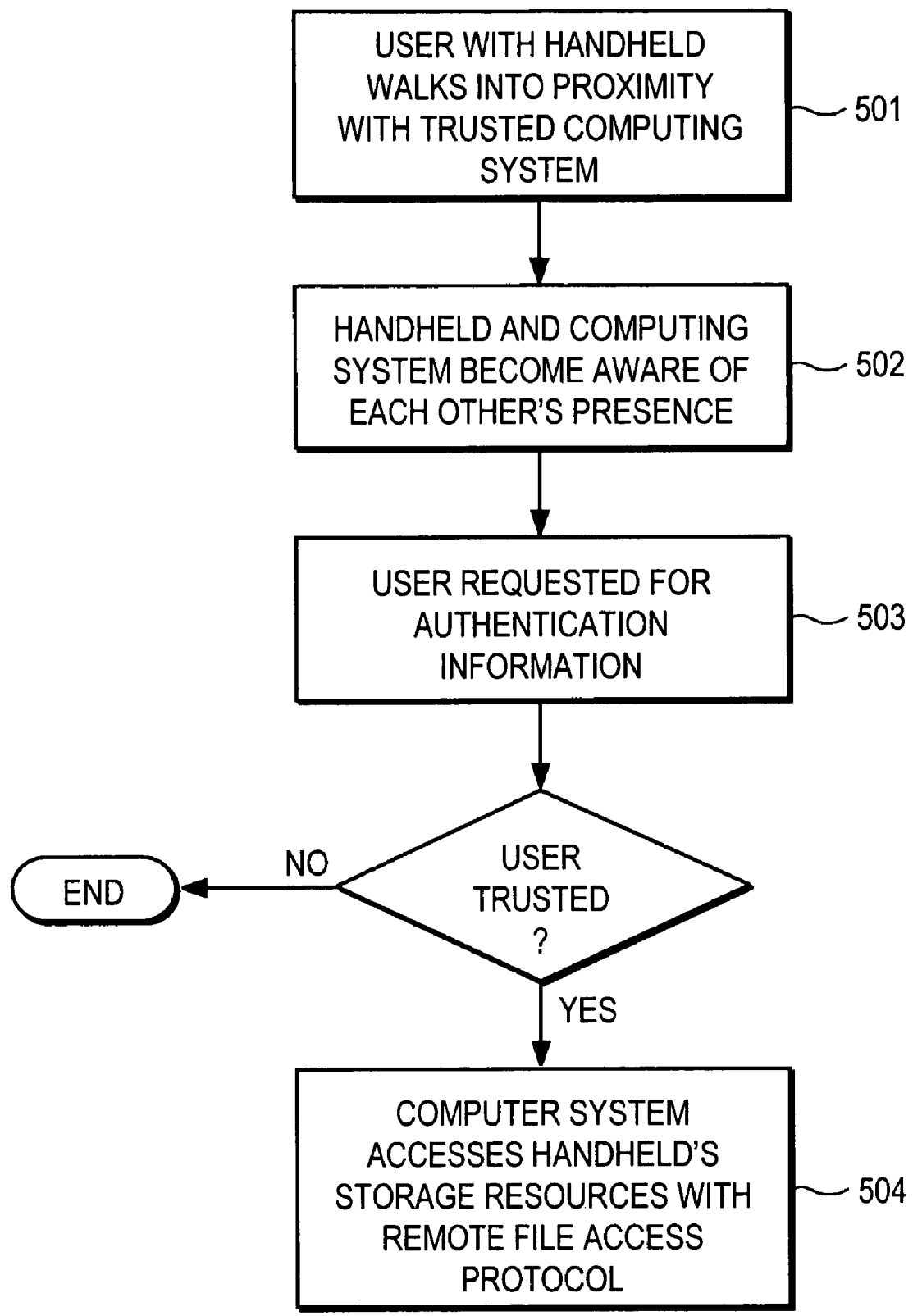
FIG. 5 shows a second process.

FIG. 5 shows an integrated methodology that mixes the features of automatic remote file access and user authentication as part of the pairing process. According to the process of FIG. 5, a user holding a handheld device walks into proximity with a computing system 501 where the computing system and the handheld device have a trusted relationship and respective operative WLAN interconnects. As a consequence of the operative WLAN interconnects, one or both of the machines become aware of the presence of the other 502. However, before a communicative session is permitted between the two machines, the user is presented with a request (e.g., on the computing system, the handheld or both) to enter some kind of authentication or verification information (e.g., a userid, password, both, etc.) 503. If the user does not respond correctly the process ends with the two machines not having established a trusted working relationship. If the user responds appropriately, the two machines establish a trusted working relationship which may include as part of the pairing sequence, among other things, the establishment of a quasi-permanent connection over the wireless network and the automatic availability of the handheld device's storage resources to the computing system 504. Again, the same process can be applied to direct contact (e.g., through a USB) rather than through wireless connectivity.

It should be emphasized above that the iPhone™'s other functions (e.g., cell phone communications, Internet communication, media playback through the iPhone™'s earphones, etc.) can be continuously operable before, during and after the aforementioned pairing sequences or attempted pairing sequences.

Figure 6:
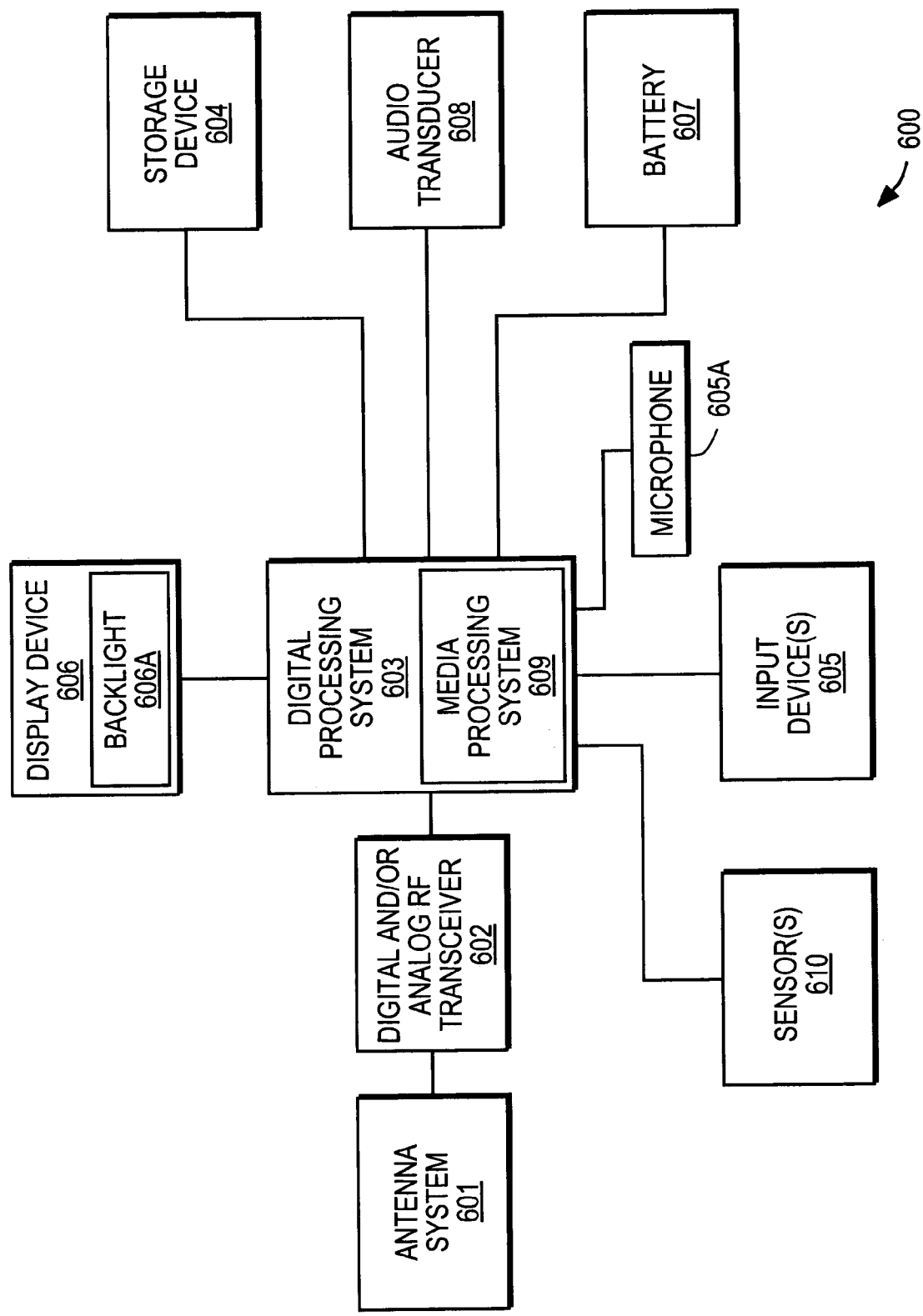
FIG. 6 shows an exemplary handheld device.

The iPhone™ is viewed, more generally, as a handheld device. FIG. 6 shows an embodiment of a handheld device 600 which adequately describes the iPhone™. Handheld device 600 may include an antenna system 601. Handheld device 600 may also include a digital and/or analog radio frequency (RF) transceiver 602, coupled to the antenna system 601, to transmit and/or receive voice, digital data and/or media signals through antenna system 601. In order to support both WLAN or WWAN multiple antenna and transceiver systems may be instantiated.

Handheld device 600 may also include a digital processing system 603 to control the digital RF transceiver and to manage the voice, digital data and/or media signals. Digital processing system 603 may be a general purpose processing unit, such as a microprocessor or controller for example. Digital processing system 603 may also include a special purpose processing device, such as an ASIC (application specific integrated circuit), FPGA (field-programmable gate array) or DSP (digital signal processor). Digital processing system 603 may also include other devices, as are known in the art, to interface with other components of handheld device 600. For example, digital processing system 603 may include analog-to-digital and digital-to-analog converters to interface with other components of handheld device 600. Digital processing system 603 may include a media processing system 609, which may also include a general purpose or special purpose processing device to manage media, such as files of audio data. The digital processing system 603 may also include memory resources for storing program code and data that is processed by a processing unit.

Handheld device 600 may also include a storage device 604, coupled to the digital processing system, to store data and/or operating programs for the handheld device 600. Storage device 604 may be, for example, any type of solid-state or magnetic memory device including non volatile storage such as FLASH memory or a hard disk drive. Program code processed by the digital processing system is typically stored in storage device 604.

Handheld device 600 may also include one or more input devices 605, coupled to the digital processing system 603, to accept user inputs (e.g., telephone numbers, names, addresses, media selections, etc.) Input device 605 may be, for example, one or more of a keypad, a touchpad, a touch screen, a pointing device in combination with a display device or similar input device. Additional input devices may be instantiated to provide, for instance, a local, physical I/O such as a USB.

Handheld device 600 may also include at least one display device 606, coupled to the digital processing system 603, to display information such as messages, telephone call information, contact information, pictures, movies and/or titles or other indicators of media being selected via the input device 605. Display device 606 may be, for example, an LCD display device. In one embodiment, display device 606 and input device 605 may be integrated together in the same device (e.g., a touch screen LCD such as a multi-touch input panel which is integrated with a display device, such as an LCD display device). Examples of a touch input panel and a display integrated together are shown in U.S. published application No. 20060097991. The display device 606 may include a backlight 606a to illuminate the display device 606 under certain circumstances. It will be appreciated that the handheld device 600 may include multiple displays.

Handheld device 600 may also include a battery 607 to supply operating power to components of the system including digital RF transceiver 602, digital processing system 603, storage device 604, input device 605, microphone 605A, audio transducer 608, media processing system 609, sensor(s) 610, and display device 606. Battery 607 may be, for example, a rechargeable or non-rechargeable lithium or nickel metal hydride battery.

Handheld device 600 may also include audio transducers 608, which may include one or more speakers, and at least one microphone 605A.

Handheld device 600 may also include one or more sensors 610 coupled to the digital processing system 603. The sensor(s) 610 may include, for example, one or more of a proximity sensor, accelerometer, touch input panel, ambient light sensor, ambient noise sensor, temperature sensor, gyroscope, a hinge detector, a position determination device, an orientation determination device, a motion sensor, a sound sensor, a radio frequency electromagnetic wave sensor, and other types of sensors and combinations thereof. Based on the data acquired by the sensor(s) 610, various responses may be performed automatically by the digital processing system, such as, for example, activating or deactivating the backlight 606a, changing a setting of the input device 605 (e.g. switching between processing or not processing, as an intentional user input, any input data from an input device), and other responses and combinations thereof.

In one embodiment, digital RF transceiver 602, digital processing system 603 and/or storage device 604 may include one or more integrated circuits disposed on a printed circuit board (PCB).

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.) or may be compiled directly into object code.

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium.

Figure 7:
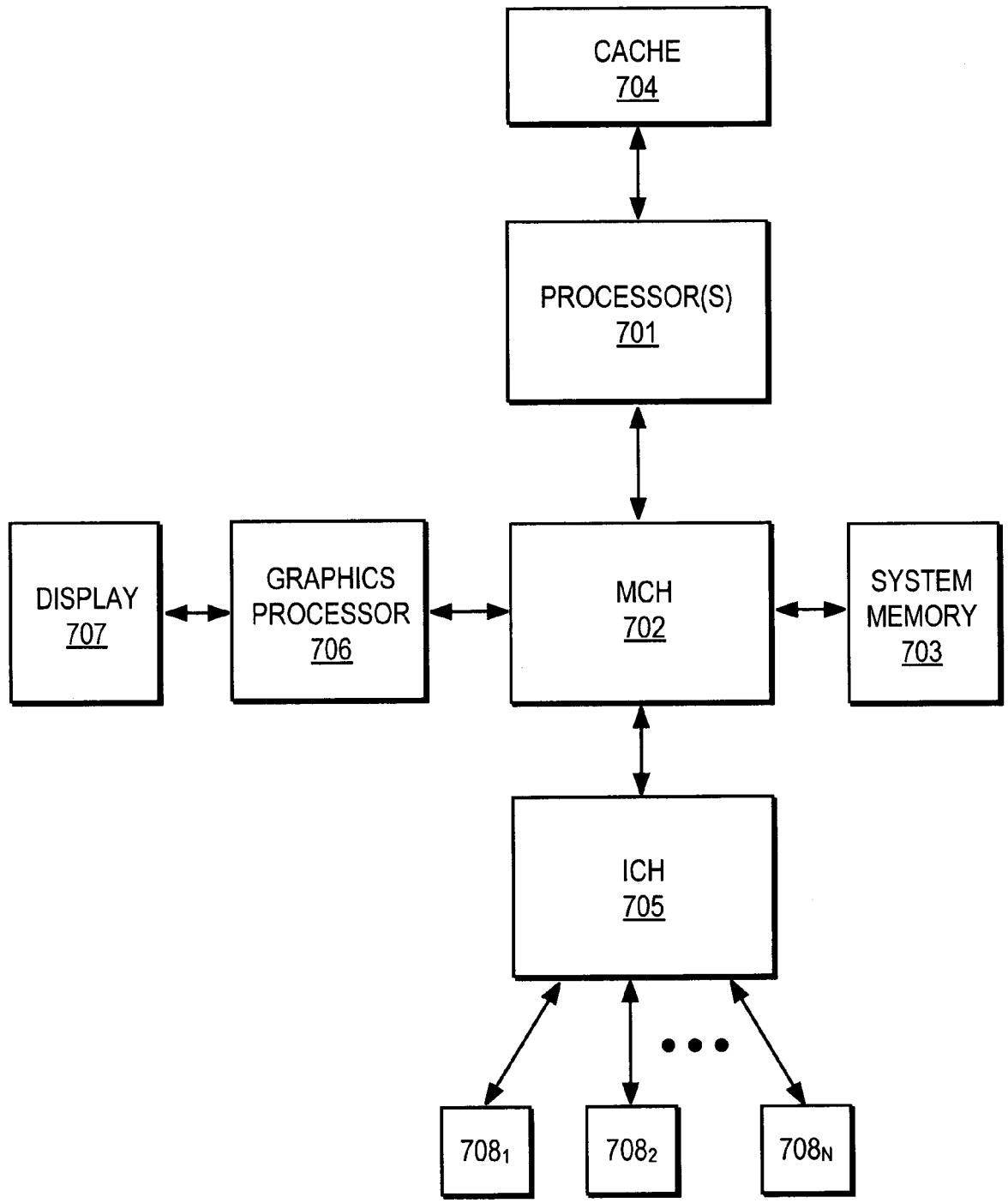
FIG. 7 shows an exemplary computing system.

The PC 300 of FIG. 3 is generally understood to be a computing system an exemplary architecture of which is depicted in FIG. 7. FIG. 7 shows an embodiment of a computing system (e.g., a computer). The exemplary computing system of FIG. 7 includes: 1) one or more processors 701; 2) a memory control hub (MCH) 702; 3) a system memory 703 (of which different types exist such as DDR RAM, EDO RAM, etc,); 4) a cache 704; 5) an I/O control hub (ICH) 705; 6) a graphics processor 706; 7) a display/screen 707 (of which different types exist such as Cathode Ray Tube (CRT), Thin Film Transistor (TFT), Liquid Crystal Display (LCD), DPL, etc.; 8) one or more I/O devices 708.

The one or more processors 701 execute instructions in order to perform whatever software routines the computing system implements. The instructions frequently involve some sort of operation performed upon data. Both data and instructions are stored in system memory 703 and cache 704. Cache 704 is typically designed to have shorter latency times than system memory 703. For example, cache 704 might be integrated onto the same silicon chip(s) as the processor(s) and/or constructed with faster SRAM cells whilst system memory 703 might be constructed with slower DRAM cells. By tending to store more frequently used instructions and data in the cache 704 as opposed to the system memory 703, the overall performance efficiency of the computing system improves.

System memory 703 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 703 prior to their being operated upon by the one or more processor(s) 701 in the implementation of a software program. Similarly, data that a software program determines should be sent from the computing system to an outside entity through one of the computing system interfaces, or stored into an internal storage element, is often temporarily queued in system memory 703 prior to its being transmitted or stored.

The ICH 705 is responsible for ensuring that such data is properly passed between the system memory 703 and its appropriate corresponding computing system interface (and internal storage device if the computing system is so designed). The MCH 702 is responsible for managing the various contending requests for system memory 703 access amongst the processor(s) 701, interfaces and internal storage elements that may proximately arise in time with respect to one another.

One or more I/O devices 708 are also implemented in a typical computing system. I/O devices generally are responsible for transferring data to and/or from the computing system (e.g., a networking adapter); or, for large scale non-volatile storage within the computing system (e.g., a hard disk drive). ICH 705 has bi-directional point-to-point links between itself and the observed I/O devices 708.

It is believed that processes taught by the discussion above can be practiced within various software environments such as, for example, object-oriented and non-object-oriented programming environments, Java based environments (such as a Java 2 Enterprise Edition (J2EE) environment or environments defined by other releases of the Java standard), or other environments (e.g., a .NET environment, a Windows/NT environment each provided by Microsoft Corporation).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Although the presentation has repeatedly referred to the iPhone™ it should be understood that the claims that follow are not to be construed as being directly solely to iPhone™ products.

We claim:

1. A method performed by a partner of a pair of paring partners to establish a paired relationship between the partners, comprising:
   detecting the presence of a pairing partner device as a consequence of said pairing partner device being locally connected to said partner through a local connection, said local connection bounded by only one transmission end and only one reception end for communications headed in a particular direction;
   prior to establishing a paired relationship with said pairing partner device, prompting a user to verify himself/herself;
   pairing with said pairing partner device in response to said user properly verifying himself/herself, said pairing including said pairing partners authenticating each other by passing a unique pass code between said pairing partners over said local connection, said unique pass code agreed to between said pairing partners before said detecting;
   invoking a remote storage protocol between said pairing partners to establish on a first of the pairing partners access to non volatile storage resources through said local connection for general use, said non volatile storage resources located on a second of the pairing partners, said remote storage protocol designed to provide access to remote storage over a network having multiple nodal hops.

2. The method of claim 1 wherein said pairing includes performing network connection establishment routines applicable to said network on said first and second partners to establish a connection between said partners.

3. The method of claim 2 wherein said local connection physically connects said partner to said pairing partner device.

4. The method of claim 3 wherein said local connection is a Universal Serial Bus (USB).

5. The method of claim 4 wherein said local connection is one of: WiFi
   Bluetooth.

6. The method of claim 1 wherein a software instance that performs said remote storage protocol also performs said pairing and said prompting.

7. The method of claim 1 further comprising said partner detecting an incoming cell phone call while said pairing partner device is accessing said non volatile storage resources.

8. A handheld device, comprising:
   a) a wireless wide area network interface, said wireless wire area network interface to transport cell phone communications and Internet communications;
   b) a local interconnect interface to transport information between two devices only over a local connection bounded by only one transmission end and only one reception end for communications headed in a particular direction;
   c) a non volatile storage resource;
   d) a processing unit;
   e) remote storage access protocol program code, said remote storage access protocol program code to perform a method when processed by said processing unit that includes providing access to said non volatile storage resource for general use through said local interconnect interface, said remote storage protocol of said remote storage access protocol program code designed to provide access to remote storage over a network having multiple nodal hops;
   e) pairing protocol program code, said pairing protocol program code to perform a method when processed by said processing unit that includes:
      prompting said handheld device's user for identity verification information;
      if said verification information is correct, pairing said handheld device with a pairing partner through said local interconnect interface;
      said pairing including engaging in the passing of a unique pass code with said pairing partner, said pass code agreed to beforehand by said handheld device and said pairing partner.

9. The handheld device of claim 8 above wherein said pairing protocol program code is embedded within said remote storage access protocol program code.

10. The handheld device of claim 8 wherein said local interconnect is a USB.

11. The handheld device of claim 8 wherein said non volatile storage resource includes FLASH memory.

12. The handheld device of claim 8 wherein said non volatile storage resource includes a hard disk drive.

13. The handheld device of claim 8 wherein said pairing protocol program code and said remote storage access protocol program code are stored on said non volatile storage resource.

14. A computing system, comprising:
    a) a processing unit;
    b) non volatile storage resources containing:
       i) pairing authentication program code that engages in the passing of a unique pass code with a pairing partner, said unique pass code agreed to between said computing system and said pairing partner;
       ii) wireless network interface program code that, when processed by said processing unit, causes a first method to be performed that includes:
          establishing a connection to said pairing partner in conformance with a wireless network connection establishment protocol over a local I/O port that sends/receives information to/from said pairing partner, said connection bounded by only one transmission end and one reception end for communications headed in a particular direction;
       iii) remote file access protocol program code that, when processed by said processing unit, causes a second method to be performed that includes:
          providing access to remote storage resources on said pairing partner available through said I/O port and said connection, said remote storage resources available for general use by said computing system
          said remote file access protocol of said remote file access protocol program code designed to provide access to remote storage over a network having multiple nodal hops.

15. The computing system of claim 14 further comprising pairing protocol program code within said non volatile storage resources that, when processed by said processing unit, causes a third method to be performed that includes:
    prompting a user of said computing system to provide identity verification information as a condition precedent to performing said second method.

16. The computing system of claim 15 wherein said pairing protocol program code is embedded within said remote file access protocol program code.

17. A computing system, comprising:
    program code that when processed by a digital processing device of said computing system causes a method to be performed, said method including:

detecting the presence of a pairing partner;
prior to establishing a paired relationship with said pairing partner, prompting a user to verify himself/herself; and,
pairing with said pairing partner in response to said user properly verifying himself/herself, said pairing including engaging in the passing of a unique pass code with said pairing partner over a local connection between said pairing partner and said computing system bounded by only one transmission end and one reception end for communications headed in a particular direction, said pass code agreed to beforehand by said computing system and said pairing partner, said pairing including invoking a remote storage protocol between said pairing partner and said computing system to establish on one of said computing system and said pairing partner access to non volatile storage resources located on the other of said computing system and said pairing partner for general use, the other of said computing system and said pairing partner being a handheld device that provides wireless cell phone service, wireless Internet service and music playback service, said remote storage protocol designed to provide access to remote storage over a network having multiple nodal hops.

18. The computing system of claim 17 wherein said pairing includes performing network connection establishment routines applicable to a wireless WAN network on said computing system to establish a connection to said pairing partner.

19. The computing system of claim 17 wherein said single physical communication medium is a Universal Serial Bus (USB) communication medium.

20. The computing system of claim 17 wherein said single physical communication medium is an air medium.

21. The computing system of claim 20 wherein said passing of said passcode includes passing said passcode over one of the following communication technologies:
WiFi
Bluetooth.

* * * * *

UNITED STATES PATENT AND TRADEMARK OFFICE
CERTIFICATE OF CORRECTION

PATENT NO. : 8,090,767 B2  Page 1 of 1
APPLICATION NO. : 12/008068
DATED : January 3, 2012
INVENTOR(S) : Mitch Adler et al.

It is certified that error appears in the above-identified patent and that said Letters Patent is hereby corrected as shown below:

In the Claims

Col. 9 line 1, "a pair of paring" should read --a pair of pairing--.
Col. 9 line 30, "claim 1 wherein" should read --claim 1, wherein--.
Col. 9 line 33, "said partners." should read --said pairing partners.--.
Col. 9 line 34, "claim 2 wherein" should read --claim 2, wherein--.
Col. 9 line 37, "claim 3 wherein" should read --claim 3, wherein--.
Col. 9 line 39, "claim 4 wherein" should read --claim 4, wherein--.
Col. 9 line 42, "claim 1 wherein" should read --claim 1, wherein--.
Col. 9 line 45, "claim 1 further" should read --claim 1, further--.
Col. 9 line 50, "wire area" should read --wide area--.
Col. 10 line 13, "claim 8 above" should read --claim 8, above--.
Col. 10 line 16, "claim 8 wherein" should read --claim 8, wherein--.
Col. 10 line 18, "claim 8 wherein" should read --claim 8, wherein--.
Col. 10 line 20, "claim 8 wherein" should read --claim 8, wherein--.
Col. 10 line 22, "claim 8 wherein" should read --claim 8, wherein--.
Col. 10 line 54, "claim 14 further" should read --claim 14, further--.
Col. 10 line 61, "claim 15 wherein" should read --claim 15, wherein--.
Col. 11 line 1, "the presence" should read --a presence--.
Col. 12 line 5, "claim 17 wherein" should read --claim 17, wherein--.
Col. 12 line 9, "claim 17 wherein" should read --claim 17, wherein--.
Col. 12 line 12, "claim 17 wherein" should read --claim 17, wherein--.
Col. 12 line 14, "claim 20 wherein" should read --claim 20, wherein--.

Signed and Sealed this
Twenty-sixth Day of August, 2014

Michelle K. Lee
*Deputy Director of the United States Patent and Trademark Office*